US008463408B2

(12) United States Patent
Boleko Ribas

(10) Patent No.: US 8,463,408 B2
(45) Date of Patent: Jun. 11, 2013

(54) LIGHT CONTROL SYSTEM AND METHOD FOR AUTOMATICALLY RENDERING A LIGHTING ATMOSPHERE

(75) Inventor: Salvador Expedito Boleko Ribas, Barcelona (ES)

(73) Assignee: Koninklijke Philips Electronics N.V., Eindhoven (NL)

( * ) Notice: Subject to any disclaimer, the term of this patent is extended or adjusted under 35 U.S.C. 154(b) by 414 days.

(21) Appl. No.: 12/740,372

(22) PCT Filed: Nov. 4, 2008

(86) PCT No.: PCT/IB2008/054575
§ 371 (c)(1),
(2), (4) Date: Apr. 29, 2010

(87) PCT Pub. No.: WO2009/060377
PCT Pub. Date: May 14, 2009

(65) Prior Publication Data
US 2010/0283393 A1   Nov. 11, 2010

(30) Foreign Application Priority Data
Nov. 6, 2007   (EP) .................................... 07120084

(51) Int. Cl.
*G05B 11/01*   (2006.01)
(52) U.S. Cl.
USPC .............................................. 700/11; 700/19
(58) Field of Classification Search
USPC .................................................... 700/11, 19
See application file for complete search history.

(56) References Cited

U.S. PATENT DOCUMENTS

| 6,118,231 A | 9/2000 | Geiginger et al. |
| 2002/0180973 A1 | 12/2002 | MacKinnon et al. |
| 2006/0076908 A1 | 4/2006 | Morgan et al. |

FOREIGN PATENT DOCUMENTS

| EP | 1067825 B1 | 1/2001 |
| WO | 0237454 A2 | 5/2002 |
| WO | 2004086824 A1 | 10/2004 |
| WO | 2005052751 A1 | 6/2005 |
| WO | 2006003624 A2 | 1/2006 |
| WO | 2007072339 A2 | 6/2007 |
| WO | 2008038188 A2 | 4/2008 |
| WO | 2008078286 A1 | 7/2008 |
| WO | 2008135894 A1 | 11/2008 |

OTHER PUBLICATIONS

Zhao et al: "Lighting Landscape Analysis and its Mathematic Model"; (No. 096), Architecture and Civil Engineering School, Shenzhen University, 11 Page Document, Downloaded From http:www.rightlight6.org/english/proceedings/Poster_Session/Lighting_Landscape_Analysis/f096zhao.doc.

(Continued)

*Primary Examiner* — Carlos Ortiz Rodriguez
(74) *Attorney, Agent, or Firm* — John F. Salazar; Mark L. Beloborodov

(57) ABSTRACT

Automatic rendering of a lighting scene with a lighting system, particularly the control of the rendering. Rendering of the lighting scene by decomposing a lighting atmosphere to be rendered in elementary light effects, to classify the elementary light effects, and to coordinate the realization of the classified light effects with the lighting system. A light control system for automatically rendering the lighting atmosphere with the lighting system, wherein the light control system is adapted for decomposing the lighting atmosphere to be rendered in elementary light effects, classifying the elementary light effects into sets of light effects, and coordinating the realization of the sets of light effects with the lighting system. An automatic light control system to autonomously determining the lighting configuration settings needed by light modules of the lighting system to realize a desired lighting atmosphere while its elementary lighting effects are harmonically rendered.

8 Claims, 2 Drawing Sheets

OTHER PUBLICATIONS

Figure 1:
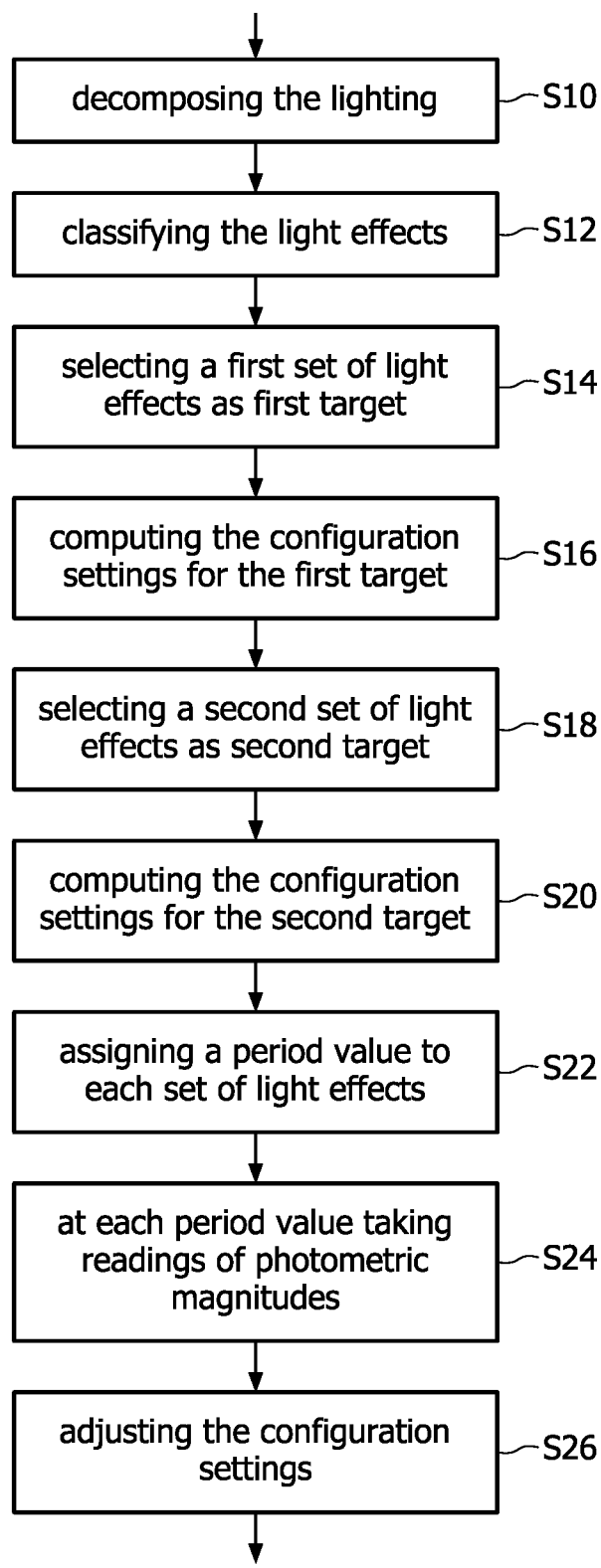

El-Nasr et al: "Automating Lighting Design for Interactive Entertainmentf"ACM Computers in Entertainment, vol. 2, No. 2, April 2004, Article 05, 19 Page Document.

Bharath et I : "Stochastic Approximation Algorithms: Overview and Recent Trends"; Sadhana (Academy Proceedings in Engineering Sciences), vol. 24, Parts 4 & 5, Aug. & Oct. 1999, pp. 425-452.

Spall: "An Overview of the Simultaneous Perturbation Method for Efficient Optimism"; Johns Hopkins APL Technical Digest, vol. 19, No. 4, (1998), pp. 482-492.

Allgower et al: "Nonlinear Model Predictive Control: From Theory to Application"; Journal of Chinese Institute of Chemical Engineers; vol. 35, No. 3, pp. 299-315, 2004.

LIGHT CONTROL SYSTEM AND METHOD FOR AUTOMATICALLY RENDERING A LIGHTING ATMOSPHERE

The invention relates to the automatic rendering of a lighting atmosphere with a lighting system, particularly the control of the rendering.

Technological developments in lighting modules, for example solid-state lighting, allow for creation of elaborated lighting atmospheres, which benefit from the use of enhanced illumination features like colour, (correlated) colour temperature, variable beam width etcetera. In order to efficiently control the numerous control parameters of these lighting modules, advanced light controls systems were developed, which are able to assist an end-user in configuring the settings of the lighting modules. These advanced light control systems may be also able to automatically render certain lighting atmospheres in a room, for example from a XML file containing an abstract description of a certain lighting atmosphere, which is automatically processed for generating control values or parameters for the lighting modules of a concrete lighting infrastructure. Generally, lighting atmospheres can be defined as a collection of lighting effects that harmoniously concur in space and time, for example to create an artificial indoor lighting.

In former times, artificial indoor lighting was primarily meant to play the role of sunlight and enable people to develop tasks by supplying adequate illumination levels. The so-called ambient lighting and task lighting cases in indoor lighting clearly exemplify these functions. Later on, additionally artificial indoor lighting has also been used for ornamentation purposes. The clear paradigm of this application is accent lighting. Realisation of lighting atmospheres, which could be defined as elaborated sets of lighting effects, which concur in space and time, demands harmonious integration of both sorts of effects. On the one hand, the light effects due to ambient and task lighting should not prevent that the beautification due to accent lighting was not appreciated, whereas the consequence of the use accent lighting should not prevent the accomplishment of the functional lighting requirements.

As to date this harmonisation is achieved through the expertise of professionals of lighting design. They manually adjust the level of all light sources involved in one lighting scene. Moreover, their adjustments are rather based in their knowledge and perception than in tightly following functional requirements, consequently their adjustments are rather biased to aesthetics than to the functional requirements of ambient and task lighting. This manual tuning step may be nowadays still sensible as current lighting systems often do neither feature much redundancy, i.e. high number of degrees of freedom, nor freedom of configuration. However, this should not be the case for future lighting systems anymore and for that reason it is sensible to devise solutions that:

1. harmoniously integrate the two presented paradigms by realising the intended light effects that build up a lighting scene
2. save time invested in manual tweaking of the present lighting hardware, by minimising the required human and skilled intervention US2006/0076908 A1 relates to lighting networks that include multiple LED-based lighting units, and user interfaces to facilitate control of such networks. Lighting units of a lighting network may be configured to generate one or more of variable colour light, variable intensity light, and variable colour temperature white light. Different areas of an environment in which light is provided by the lighting network may be divided into respective lighting zones, and some or all of the lighting units of the lighting network may be configured so as to provide controllable lighting in one or more such lighting zones. One or more user interfaces are configured so as to allow relatively simplified and intuitive control of the lighting network, either manually (in real time) or via one or more user selectable predetermined lighting programs.

It is an object of the present invention to provide an improved light control system and method for automatically rendering a lighting scene.

The object is solved by the independent claims. Further embodiments are shown by the dependent claims.

A basic idea of the invention is to improve rendering of a lighting scene by decomposing a lighting atmosphere to be rendered in elementary light effects, to classify the elementary light effects, and to coordinate the realisation of the classified light effects with the lighting system. According to an embodiment of the invention, the elementary light effects of complex indoor lighting atmospheres that are pleasant to human sight may be classified into different categories, which play different functional roles and objectives, namely ambient lighting, task lighting and accent lighting. The present invention enables an automatic light control system to autonomously determining the lighting configuration settings needed by light modules of a lighting system to realise a desired lighting atmosphere whilst its elementary effects are harmonically rendered.

An embodiment of the invention provides a light control system for automatically rendering a lighting atmosphere with a lighting system, wherein the light control system is adapted for decomposing the to be rendered lighting atmosphere in elementary light effects, classifying the elementary light effects into sets of light effects, and coordinating the realisation of the sets of light effects with the lighting system.

The realisation may particularly coordinated at different time-scales according to prioritisation criteria, With such a system, the problem of harmonically rendering a lighting atmosphere is decomposed into sub-problems in accordance with the different functions of the lighting categories available with a lighting system. The sub-problems are the sets of light effects which may be better processed by algorithms for automatically render a lighting atmosphere from the light effects. Particularly, the harmonically rendering of the lighting atmosphere may be carried out in such way that a user does not observe any flickering or other abrupt and disturbing variation of brightness or colour in the lighting atmosphere.

Particularly, in an embodiment of the invention, the elementary light effects may comprise at least two of the following:

ambient light effects to be provided by ambient lighting modules of the lighting system;

task light effects to be provided by task lighting modules of the lighting system;

accent light effects to be provided by accent lighting modules of the lighting system.

Ambient, task, and accent light effects play different functional roles and objectives in the composition of a lighting atmosphere and, therefore, are suited to be separated by a decomposition.

Furthermore, according to an embodiment of the invention, one set of light effects may comprise ambient and task light effects and another set of light effects may comprise accent light effects. Ambient and task light effects on the one hand and accent light effects on the other hand are different effects with different functional roles in lighting atmospheres. For example, the ambient and task light effects should not prevent that the beautification due to accent light effect may not be appreciated, whereas the consequence of the use of accent light effects should not prevent the accomplishment of the functional lighting requirements performed by ambient and task light effects.

In an further embodiment of the invention, the coordinating of the realisation of the sets of light effects may comprise computing an initial estimation of configuration settings for realizing each set of light effects with the lighting system, and gradually refining the different configuration settings in a closed-loop fashion using different time scales for different sets of light effects.

The computed initial estimation may be a first rendering of the desired lighting atmosphere in order to create a starting point for the further gradually refining process and for obtaining first measurement values as input for the refining process.

The computing of an initial estimation of configuration settings for realizing each set of light effects with the lighting system may in an embodiment of the invention comprise selecting a first set of light effects as first target, computing the configuration settings for the first target so that only performance indexes associated to the light effects of the first target are evaluated and light modules of the lighting system, which are provided for light effect not contained in the first target, are switched off, selecting a second set of light effects as second target, and computing the configuration settings for the second target so that only performance indexes associated to the light effects of the second target are evaluated and the computed configuration settings for the first target are applied to the respective light modules of the lighting system.

For example, the first selected set may be a set with ambient and task light effects, whereas the selected second set may be the set with accent light effects. For the computing of the configuration settings for the second target (set), the computed configuration settings for the first target (set) act as boundary conditions to compute the settings needed to render for example the accent light effects in the overall lighting atmosphere composed with for example the ambient and task light effects.

The first computation may, for instance, be performed through one of the following approximated methods in an embodiment of the invention: a point-by-point illumination method; a method using isolux lines. These methods are non-computationally costly and allow to quickly estimating a reasonable starting point solution.

The gradually refining the different configuration settings in a closed-loop fashion using different time scales may comprise according to an embodiment of the invention assigning a period value to each set of light effects, wherein the period values of all sets of light effects differ in their length, at each period value taking readings of photometric magnitudes, which are relevant to the light effects of the set of light effects associated with the actual period value, and indexes thereof derived with photo-detectors, and evaluating the divergence between the actually rendered and the intended light effects of the lighting atmosphere, and adjusting the configuration settings for realising each set of light effects with the lighting system based on the evaluated divergences.

A period value defines a time scale for adjusting the configuration settings. Thus, each set of light effects has its own time scale and may be independently adjusted. Typically, the period value represents a sampling period for taking samples of a rendered lighting atmosphere, i.e. readings of photometric magnitudes, and evaluating the taken samples.

According to a further embodiment of the invention, the adjusting of the configuration settings may comprise evaluating from the evaluated divergences performance indexes for each set of light effects and based on the evaluation of the performance indexes applying a control algorithm to adjust the configuration settings.

The control algorithm may comprise in an embodiment of the invention applying stochastic optimization techniques as foundation to recursively evaluating numerical parameters that are representative of suited configuration settings.

The applying of stochastic optimization techniques may comprise in an embodiment of the invention applying a method based on simultaneous perturbation stochastic approximation.

The control algorithm may also comprise a model-based predictive control, according to an embodiment of the invention.

The gradually refining of the different configuration settings may comprise in an embodiment of the invention adaptation steps of the configuration settings, which are chosen such that changes of the lighting atmosphere are smooth to the visual perception and sudden changes in brightness are prevented. This may mean for example that the above mentioned period value or sampling period is carefully chosen to avoid flicker-like perceived effect as lighting units of the lighting system are adjusted in order to refine the rendered lighting atmosphere.

The maximum variation in permitted changes in lighting intensity per iteration of the process of gradually refining may be bound in magnitude according to a further embodiment of the invention. This helps to prevent to steep changes in the lighting intensity which could be perceived unpleasantly.

A further embodiment of the invention provides light control method for automatically rendering a lighting atmosphere with a lighting system, comprising decomposing the lighting atmosphere to be rendered in elementary light effects, classifying the elementary light effects into different sets of equally classified light effects, and coordinating the realisation of the sets of equally classified light effects with the lighting system.

According to a further embodiment of the invention, a computer program may be provided, which is enabled to carry out the above method according to the invention when executed by a computer.

According to a further embodiment of the invention, a record carrier storing a computer program according to the invention may be provided, for example a CD-ROM, a DVD, a memory card, a diskette, or a similar data carrier suitable to store the computer program for electronic access.

Finally, an embodiment of the invention provides a computer programmed to perform a method according to the invention and comprising an interface for communication with a lighting system.

These and other aspects of the invention will be apparent from and elucidated with reference to the embodiments described hereinafter.

The invention will be described in more detail hereinafter with reference to exemplary embodiments. However, the invention is not limited to these exemplary embodiments.

Figure 2:
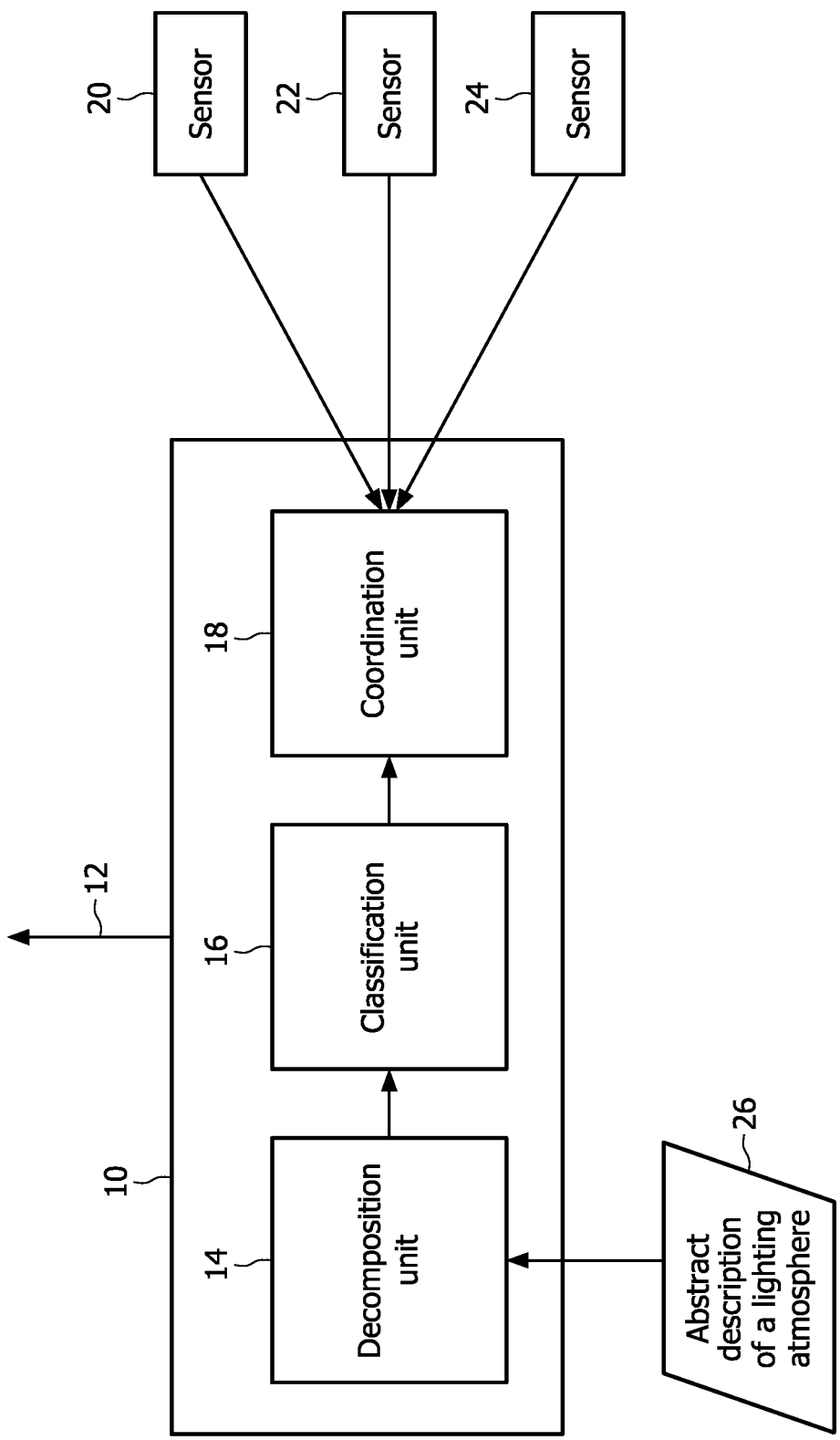

FIG. 1 a flow chart of an embodiment of a method for automatically rendering a lighting scene according to the invention; and FIG. 2 a block diagram of an embodiment of a system for automatically rendering a lighting scene according to the invention.

In the following, functionally similar or identical elements may have the same reference numerals. Furthermore, in the following description, the terms "lighting atmosphere" and "lighting scene" may be used synonymously.

The embodiments of the invention enable an automatic lighting control system to timely evaluate suited lighting configuration settings, so that ambient (task) lighting and accent lighting light effects maybe harmoniously rendered by an installed lighting system.

To that purpose, both sets of light effects are adapted to each other, taking into consideration their different roles, that is operational the one whilst decorative the other, and also the layout and capabilities of the installed lighting hardware.

So far this harmonisation could only be performed by manually tweaking the resulting lighting atmosphere. Since lighting design professionals would usually tend to emphasise the cosmetic aspects of the scene and they are not prone to tightly follow lighting engineering recommendations (as usually they cannot be easily checked) they may neglect to comply with the functional requirements.

Moreover, the invention allows to prevent over-illumination whilst it implicitly may provide for daylight harvesting (that is, sunlight can be exploited as an additional, free lighting source) and it may be therefore energy-efficient.

The herein presented embodiments of the invention may integrate as main elements one or more of the following:
- Methods that enable the evaluation of lighting control commands from given specifications of light effects.
- Photometric characteristic plots or models therefrom, that characterise the behaviour of the installed lighting hardware. They provide the relationship between the configuration settings of the light modules and the (expected) output of light modules at reference measurement points or work surfaces.
- Suited photo-sensors, which during run-time of the lighting system collect readings of light-related magnitudes at (on) reference measurement points (work surfaces).
- Processing units that exploit the antecedent items to evaluate the lighting configuration settings that fit to the specified light scene.
- Communication technologies and network infrastructure to substantiate the exchange of information among all the involved sensors, processors and actuators.

FIG. 1 shows a flowchart of a method for automatically rendering a lighting scene according to the invention. The method comprises the following essential steps:

Step S10: decomposing the lighting atmosphere to be rendered in elementary light effects. The lighting atmosphere may be read in by the system as for example an abstract description of a lighting atmosphere in XML. Then, the read in description may be analyzed for contained light effects. The analyzed light effects may form the input for the following step.

Step S12: classifying the elementary light effects into sets of light effects. This step means that the light effects analyzed in the previous step are assigned to different classes of light effects, particularly to classes for ambient, task and accent light effects. These classes may then form the different sets of light effects, or may be further grouped into a set of light effects. For example, ambient and task light effects may be differently classified, but grouped in one set of ambient and task light effects because of their similar influence on the overall perception of a lighting atmosphere, whereas accent light effects may be grouped in a own set of light effects since this kind of light effect has less influence on the overall perception of a lighting atmosphere.

In the following steps, an initial configuration of the lighting system is computed, which is later refined in order to improve the perception of the rendered lighting atmosphere.

Step S14: selecting the set of ambient and task light effects as first target for rendering the lighting atmosphere. Target means that configuration settings are computed for the selected set of light effects, whereas the other set of light effects serves as boundary.

Step S16: computing the configuration settings for the first target, wherein the computation is performed by evaluating only performance indexes associated to the light effects of the first target. The light modules of the lighting system, which are provided for light effects not contained in the first target, are switched off in order to avoid any influence on the rendering of the light effects of the first target, i.e. the ambient and task light effects.

Step S18: selecting the set of accent light effects as second target.

Step S20: computing the configuration settings for the second target, wherein the computation is performed by evaluating only performance indexes associated to the light effects of the second target. The computed configuration settings for the first target are applied to the respective light modules of the lighting system so that the accent light effects are rendered in a lighting atmosphere which is composed of ambient and task lighting effects.

In the following steps, the before computed initial configuration settings are further refined.

Step S22: assigning a first period value to the set of ambient and task light effects and a second period to the set of accent light effects. The first and second period value differ in their time length. Thus, two different time scales for refining the two sets of light effects are created.

Step S24: taking at each period value readings of photometric magnitudes, which are relevant to the light effects of the set of light effects associated with the actual period value, and indexes thereof derived with photo-detectors. Further, evaluating the divergence between the actually rendered and the intended light effects of the lighting atmosphere. Thus, the difference between the actually rendered and perceived lighting atmosphere and the desired lighting atmosphere may be determined.

Step S26: adjusting the configuration settings for realizing both sets of light effects with the lighting system based on the evaluated divergences. The adjusting of the configuration settings comprises evaluating from the evaluated divergences performance indexes for the set of ambient and task light effects and the set of accent light effects and based on the evaluation of the performance indexes applying a control algorithm to adjust the configuration settings.

In the following, the application of a two-time scale methodology to coordinate the realisation of both sets of light effects is described in more detail with regard to several embodiments of the invention. As mentioned above, the lighting scene or atmosphere to be rendered is assumed to be composed by two sub-scenes, one defined by the light effects associated to ambient and task lighting and another one defined by those associated to accent lighting.

From an initial estimation of the configuration settings for the whole lighting scene, the corresponding two sets of configuration settings are gradually refined in a closed-loop fashion using two different time scales, refer to the above described steps S22, S24, S26. The approach can be thought of as an instance of a distributed decision-taking problem featuring two (virtual) controllers, that represent the two sorts of lighting and have own objectives, which might be conflicting with each other. The control process can then be thought of as a repeated game, according to the definition of game theory. According to the definition of the players, that is the operational roles of the sets of fixtures, it is assumed that the lighting scene has at least been defined in a reasonable way (e.g. illumination levels of ambient (task) lighting are not defined so high that wash out any accent lighting effect in the room), play in a mildly cooperative way. If so, the expected outcome of the game should be a Nash equilibrium yielding a nearly optimal configuration for both sets of light modules, that realises to its best, in accordance with the capabilities of the installed fixtures, the desired lighting atmosphere.

In the following, a lighting atmosphere is considered, which is to be rendered in a certain room. It is assumed that this atmosphere results from the operation of an automated lighting or light control system, which automatically computes the configuration settings needed by the installed lighting hardware or lighting units to render desired light distributions at different areas of interest of a room. The input given to the said light control system should represent the said light distributions, which consist in colour bitmaps, colour temperature, luminance or illuminance maps, etcetera.

It is further assumed that the light modules or units present in the considered room have been split into two different categories. On the one hand the light units or fixtures in the first category are meant to supply ambient and task lighting, i.e. light needed to ensure the required lighting level and quality for performing specific visual tasks. On the other hand, the second category comprises the light modules or units meant to provide accent lighting, i.e. light mostly used for ornamentation purposes.

Likewise, the collection of light effects that constitute the intended lighting atmosphere may be split into the same two categories. Accordingly, it is also be taken for granted that the method used by the said automatic lighting control system to evaluate the settings is such that it uses a collection of figures of merit to assess the degree of achievement of the lighting scene expected for any configuration of the lighting system with regards to the desired lighting scene. Consequently, those indexes used to assess performance are also divided into the said two categories.

The elements of the lighting scene intended for the first category (ambient and task lighting) are considered as the first target of the automatic lighting control system. Then the configuration settings may be computed so that:

Just the performance indexes associated to ambient and task lighting are evaluated and;

as a constraint it is imposed that all the accent lighting fixtures are switched off (This is actually quite a sensible assumption as by definition accent lighting is devised to locally enhance areas and not to illuminate over large regions. Thus, its overall influence on ambient and task lighting elements of the scene, is expected to be negligible).

If required, because of computation time concerns and the operational requirement for ambient and task lighting to be responsive, this initial computation could be performed with approximated (non-computationally costly) methods (e.g. point-by-point illumination method or use of isolux lines) that estimated a reasonable starting-point solution.

Next, the elements of the light scene intended for the second category (accent lighting) are considered as the second target of the automatic lighting control system. Then the configuration settings may be computed so that Just the performance indexes associated to accent lighting are evaluated and;

as a constraint it is imposed that the ambient and task lighting fixtures apply the configuration settings computed in the previous step (As indicated, an operational requirement of ambient and task lighting is responsivity. Thence, if needed, the split into two steps allows for the ambient and task lighting scene to be promptly realised, whereas the (conditional) computation of the supplementary accent lighting elements in the scene could be made more slowly due to its decorative nature).

This way, the (ambient and task) lighting scene resulting from the preliminary estimated configuration settings acts as boundary conditions to compute the first estimation of the settings needed to render the accent lighting elements in the overall light atmosphere. The reason for that is that the existence of work surfaces in the room, whereon light effects from the two sets of light modules interact or overlap is quite likely.

Many alternative procedures can be applied to compute the settings for the light units in this second set. For example, the contribution of the general lighting can be characterised, hence integrated in the second calculation, through the procedure known as Darkroom Calibration (DRC). Accordingly, the measurements through photometric and photographic sensors of (certain) primary light effects caused by the luminaires at given locations is to be extended to the luminaires in the first set. Thence, by means of the identified model, the settings computed in the first stage can be quantified and incorporated to the computation of the settings for the second set of light units.

Once an initial estimation of the configuration settings for both sets of light modules has been calculated, it is fed into the lighting equipment and a light scene resembling the one desired by the user is rendered. In order to further refine the settings and harmonise the joint action of the two sets of light units, a closed-loop approach is followed. To that purpose photodetectors, which have been deployed over regions of interest, take readings of relevant (to the intended scene) photometric magnitudes and indexes thereof derived (e.g. colour coordinates, illuminance or luminance values, illumination ratios, etcetera). However, herein the sensorial measurements are restricted to the ambient and task lighting elements in the lighting atmosphere.

In addition two period values need to be chosen. One is chosen to perform the readings and adaptation for the ambient and task lighting (T1). Another lengthier one, T2, is chosen to carry out the adjustment of the accent lighting. For the sake of simplicity, the second period may be chosen to be a multiple of the first one, that is let it be T2=N*T1, where N is an integer.

When going back to the point in time, where the initial light scene has been rendered, then, after T1 seconds, the photosensors collect the measurements needed to evaluate the divergence between the actually rendered and the intended ambient and task lighting scene. Then, from the actual measurements and the targeted values, the earlier presented performance indexes defined to assess the degree of accomplishment are evaluated allowing for the application of control algorithms to adjust the (ambient and task lighting) configuration settings.

Several alternatives are possible in order to realise the suggested control. For instance, stochastic optimization techniques can be applied as foundation to recursively evaluate numerical parameters that are representative of suited control settings for the modules in the first set, as described in "Stochastic approximation algorithms: Overview and recent trends", Bharath B. and Borkar V. S., Sadhana (Academy Proceedings in Engineering Sciences), 24:425-452, 1999. More specifically, a (gradient-free) method based on the so-called simultaneous perturbation stochastic approximation (SPSA) might fit very well to the problem, as described in "An overview of the simultaneous perturbation method for efficient optimization", James C. Spall., Johns Hopkins Apl Technical Digest, 19(4):482-492, April 1998. For this case the required loss function may be evaluated as the weighted norm of the vector that collects the earlier mentioned performance indexes computed from the differences between the desired values and the ones actually measured (or estimated) at certain reference locations. In accordance with the definition of the said method, the settings are adapted through the recursion summarised by the equation $$\theta[k+1]=\theta[k]-\alpha[k](\theta[k]) \cdot g_k(\theta[k]) \quad (1)$$

where θ[k] stands for the kth iterate of the vector that holds the parameters whose values act as representative of the applied lighting control settings, α[k] typifies a non-negative scalar step-size factor, and $g_k(\theta[k])$ is the estimate of the gradient of the loss function L(θ) at the iterate θ[k]. The loss function, and its gradient, can be estimated through evaluations of the function $$y(\theta) = \sum_{i=1}^{P} \omega_i \cdot J_i(\theta) \quad (2)$$

where P stands for the number of components in vector θ, the scalar $\omega_i$ denotes the ith weighting factor, $J_i(\theta)$ represents the computed value for the ith performance index from the currently in use (ambient and task lighting) configuration settings.

Alternatively, the ambient and task lighting adjustment can be realised by applying the so-called model-based predictive control (MBPC) as control strategy. To that purpose a mathematical model of the light effects originated by the system, that allows to estimate the value of the monitored photometric magnitudes as a function of the presented input parameters (θ) should be build up for the light modules in the ambient and task lighting set. Such model is very likely to be static with regards to time, though it could also be dynamic. On the other hand it can either be linear or non-linear. In this control methodology, the system output at each sampling instant is taken as initial condition. A reference trajectory is planned in order to meet, over a finite prediction horizon, the goals defined by an ideal set-point trajectory. The said internal model is used together with a disturbance model and the previous elements to predict the system output at future time instants. The predicted output is used to calculate a sequence of future control actions. The calculation of the control sequence is made by optimising a function that evaluates the performance of the controller. Applying a receding or moving horizon strategy, only the first predicted control action is actually applied to the system, and then the loop is closed by getting the output at the next sampling period. Further details can be found in "Predictive Control with Constraints", Maciejowski J. M., Prentice Hall, Pearson Education Limited, 1st edition, May 2002, or "Nonlinear model predictive control: From theory to application", Allgoewer F., Findneisen R., and Nagy Z. K., Journal of Chinese Institute of Chemical Engineers, 35(3):299-315, March 2004.

Regardless of the chosen control algorithm the adaptation steps should be smooth to the sight of the people in the room. Sudden changes in brightness should be prevented. That is, on the one hand, the sampling period T1 should be also carefully chosen to avoid any flicker-like perceived effect as fixtures were adjusted. On the other hand, the maximum variation in the permitted changes in intensity per iteration should be bounded in magnitude. For the two presented control methodologies, the last condition can be straightforwardly actualised. On the one hand, if stochastic approximation is applied, adequate values of the step-size factor can be chosen according to the settings in use (θ[k]) (For instance it is well known that the human sight is more sensible to changes in intensity when the overall intensity is low). Even fixed variation steps could be adopted and better suited to the problem to realise the adaptation at each iteration. On the other hand if an approach using model-based predictive control is followed, constraints can be naturally imposed to the control action during its calculation.

After adjusting the configuration settings of ambient and task lighting, it is checked whether k*T1, where as pointed out k is a positive integer that counts the number of ambient and task lighting adjustment cycles, is a multiple of T2. If it is not, then a new adjustment step of the ambient and task lighting proceeds. But if it is, then is time for the accent lighting to be adapted. This may be done by following the same steps earlier described for the initial estimation of the settings for this set. That is, the lighting sub-scene associated as current configuration settings of the ambient and task lighting act as a boundary condition (as those settings remain unchanged during this adjustment), and the figures of merit associated to the accent lighting, light effects are used to evaluate fitting new configuration settings for the accent lighting fixtures.

After adjusting the configuration settings of accent lighting modules, one iteration cycle of adjustment of the lighting atmosphere has come to an end, and if needed a new one gets started by going back to a new adjustment of the ambient lighting based on the sensorial input.

FIG. 2 shows a block diagram of a light control system 10 for automatically rendering a lighting scene with a lighting system. The light control system 10 generates configuration settings 12 for lighting modules of a lighting system (not shown).

The light control system comprises a decomposition unit 14 for decomposing a lighting atmosphere to be rendered in elementary light effects. The lighting atmosphere may be described abstractly and load as data file 26 from the decomposition unit 14. The decomposition unit 14 is particularly adapted to perform step S10 of the method shown in FIG. 1. The elementary light effects contained in the lighting atmosphere are forwarded to a classification unit 16, which forms sets of light effects according to a classification of the light effects. Thus, the classification unit 16 is particularly adapted to perform step S12 of the method shown in FIG. 1. The sets of light effects are then forwarded to a coordination unit 18 for a coordinated and harmonically rendering and refining of the desired lighting atmosphere. For this purpose, the coordination unit 18 receives signals from sensors 20, 22, and 24, which are located at different locations in a room and are adapted to measure lighting parameters at these different locations. The sensors may be for example a photo-detector. The coordination unit 14 is particularly adapted to perform the steps S14 to S26 of the method shown in FIG. 1. Thus, the coordination unit 14 may be implemented by a processing unit which executes a software implementing steps S14 to S26, particularly may implement one or more of the above mentioned algorithms to perform tasks involved in rendering and refining of the desired lighting atmosphere.

The herein described invention can be applied to the automatic configuration and control of an indoor lighting infrastructure to harmoniously render a complex lighting atmosphere that feature light effects of all the indoor lighting categories: ambient, task and accent lighting.

Consequently, the invention can be reckoned as part of an advanced, future-proof lighting management system for highly complex and versatile installations. Furthermore, the solution herein disclosed might be an ideal supplemental to a method or system for automatically rendering a lighting atmosphere or scene from an abstract description.

At least some of the functionality of the invention may be performed by hard- or software. In case of an implementation in software, a single or multiple standard microprocessors or microcontrollers may be used to process a single or multiple algorithms implementing the invention.

It should be noted that the word "comprise" does not exclude other elements or steps, and that the word "a" or "an" does not exclude a plurality. Furthermore, any reference signs in the claims shall not be construed as limiting the scope of the invention.

The invention claimed is:

1. A light control system having a processor for automatically rendering a desirable lighting atmosphere, at least partially abstractly defined by a data file, with a lighting system having a plurality of lighting modules including at least one ambient lighting module, at least one task lighting module, and at least one accent lighting module, the light control system comprising:
    a decomposition unit for decomposing the desirable lighting atmosphere in elementary light effects by analyzing the data file, wherein the elementary light effects comprise at least two of the following: ambient light effects, task light effects, and accent light effects,
    a classification unit for classifying the elementary light effects into at least a first set and a second set of light effects, wherein each of the first set and second set comprise one or more of the elementary light effects, and
    a coordination unit for coordinating a realisation of the at least first set and second set of light effects with the lighting system by determining and refining configuration settings of the plurality of lighting modules,
wherein the coordinating of the realisation of the sets of light effects includes computing an initial estimation of configuration settings for realizing each of the sets of light effects with the lighting system, and
    gradually refining the configuration settings in a closed-loop control system by independently adjusting different time scales for the at least first set and second set of light effects;
wherein the computing an initial estimation of configuration settings for realizing each of the sets of light effects with the lighting system includes:
    selecting the first set of light effects as first target,
    computing the configuration settings for the first target so that only performance indexes associated to light effects of the first target are evaluated and light modules of the lighting system, which are provided for light effects not contained in the first target, are switched off,
    selecting the second set of light effects as second target, and
    computing the configuration settings for the second target so that only performance indexes associated to light effects of the second target are evaluated, wherein the computed configuration settings for the first target and second target are applied to respective light modules of the plurality of lighting modules of the lighting system.

2. The system of claim 1, wherein one set of the sets of light effects comprises ambient and task light effects and another set of the sets of light effects comprises accent light effects.

3. The system of claim 1, wherein the gradually refining the configuration settings in the closed-loop system by independently adjusting different time scales comprises:
    assigning a period value to each of the sets of light effects, wherein the period values of the sets of light effects may differ in length,
    at each period value taking readings of photometric magnitudes, which are relevant to light effects of the sets of light effects associated with an actual period value, and relevant to indexes derived with photo-detectors, and evaluating divergences between actually rendered and intended light effects of the lighting atmosphere, and
    adjusting the configuration settings for realising each of the sets of light effects with the lighting system based on the evaluated divergences.

4. The system of claim 3, wherein the adjusting the configuration settings comprises evaluating from the evaluated divergences, performance indexes for each of the sets of light effects and based on the evaluation of the performance indexes applying a control algorithm to adjust the configuration settings, the control algorithm comprising applying stochastic optimization techniques as foundation to recursively evaluating numerical parameters that are representative of suited configuration settings.

5. The system of claim 4, wherein the control algorithm comprises a model-based predictive control.

6. The system of claim 1, wherein the gradually refining the configuration settings comprises adaptation steps of the configuration settings, which are chosen such that changes of the lighting atmosphere are smooth to visual perception and sudden changes in brightness are prevented.

7. The system of claim 6, wherein a maximum variation in permitted changes in lighting intensity per iteration of the gradually refining are bound in magnitude.

8. A light control method implemented on a computer having a processor for automatically rendering a desirable lighting atmosphere, at least partially abstractly defined by a data file, with a lighting system, the method comprising the steps of:
    decomposing the lighting atmosphere in elementary light effects, wherein the elementary light effects comprise at least two of the following: ambient light effects, task light effects, and accent light effects;
    classifying the elementary light effects into at least a first set and a second set of similarly classified light effects, wherein each of the first set and second set comprise one or more of the elementary light effects; and
    coordinating a realisation of the at least first set and second set of similarly classified light effects with the lighting system by determining and refining configuration settings for one or more lighting modules of the lighting system; computing an initial estimation of the configuration settings for realizing each of the sets of light effects with the lighting system,
    selecting the first set of light effects as first target,
    computing the configuration settings for the first target so that performance indexes associated to light effects of the first target are evaluated and light modules of the lighting system, which are provided for light effects not contained in the first target, are switched off,
    selecting the second set of light effects as second target,
    computing the configuration settings for the second target so that performance indexes associated to light effects of the second target are evaluated, wherein the computed configuration settings for the first target and second target are applied to respective light modules of the plurality of lighting modules of the lighting system, and refining the configuration settings in a closed-loop system by independently adjusting different time scales for the at least first set and second set of light effects.

* * * * *